March 7, 1950      C. A. REIMSCHISSEL      2,499,971
CHASER HOLDER
Filed Nov. 28, 1944      2 Sheets-Sheet 1
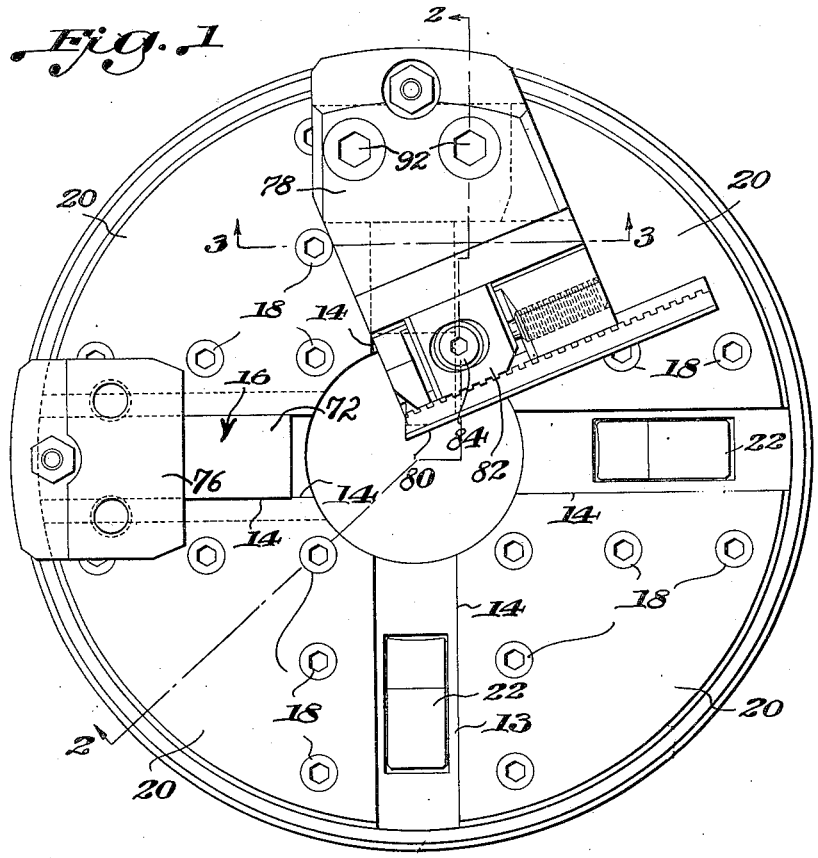
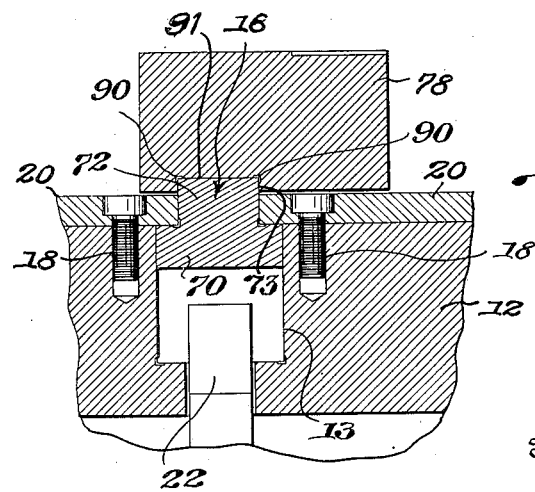

March 7, 1950

C. A. REIMSCHISSEL 2,499,971

CHASER HOLDER

Filed Nov. 28, 1944

Inventor
C. A. Reimschissel

By
A. Yates Dowell
Attorney

Patented Mar. 7, 1950

2,499,971

UNITED STATES PATENT OFFICE 2,499,971

CHASER HOLDER

Charles A. Reimschissel, Waynesboro, Pa., assignor to Landis Machine Company, Waynesboro, Pa., a corporation of Pennsylvania Application November 28, 1944, Serial No. 565,473

6 Claims. (Cl. 10—104)

This invention relates to the art of threading, and more particularly to die heads for cutting threads on bodies such as, for example, rods, bolts, screws, pipes, or the like, and using well-known cutting elements, for example, tangentially disposed thread cutting chasers which are ground upon their ends for sharpening.

In the die heads of the above character holders for the chasers or thread cutting elements are radially adjustable by suitable means, such as cams, coacting directly with the chaser holders of the die heads to dispose them in position for cutting threads of the desired diametric size. Also, an automatic release is employed for positively withdrawing or disengaging the thread cutting elements from the work upon the completion of the thread cutting operation. Heretofore with the above described die heads, when a number of chaser holders of various helix angles were employed interchangeably as occasion required, the slide portions of each set received different amounts of wear. It also has been necessary to take the die head completely apart and reassemble the same in order to generate threads of different helix angles.

In view of the above it is apparent that prior constructions have been found unsatisfactory, and one of the most unsatisfactory features was the fact that the helix angle of the thread to be cut was formed in the chaser carrying member of the die head so that when it was desired to cut the thread of a different helix angle the entire unit had to be replaced. The above objectionable features have been substantially eliminated by the present invention, and the same slide can be allowed to remain in the die head until worn out.

It is, therefore, an object of the invention to overcome the aforementioned difficulties and to provide chaser carrying members or holders which can be replaced for the production of threads of different helix angles, without the necessity of taking apart the entire die head.

Another object of the invention is to reduce the cost of said replacements by making the chaser carrying member simpler and cheaper.

A further object of the invention is to make in separate parts or to separate the wearing or slide portions from the chaser carrying portions so that after inevitable wear on the slides they may be replaced without the necessity of replacing a large inventory of expensive chaser carrying members having various helix angles.

It is another object of the invention to provide a variety of chaser carrying members which may be used with the same slide member, thereby avoiding the necessity of duplicating the latter.

A further object of the invention is to provide a more rugged and positive camming between the chaser slide and the closing ring of the die head.

A still further object of the invention is to provide a joint between the slides and the chaser portions of the mechanism which will compel their operation under all conditions to be identical with that of a one-piece chaser holder, and which will permit complete interchangeability and mass production.

The chaser carrying members which comprise the present invention are for purposes of illustration shown in connection with a die head of the character of that disclosed in my Patent 2,291,919, granted August 4, 1942, while the chaser cam and cooperating parts of the chaser holder correspond to those disclosed in my Patent No. 2,239,735.

The chaser carrying members of the present inventions each are modified in that it is made of two parts. One of these parts performs the functions of accurately and properly seating and clamping the thread cutting elements or chasers in correct relation to the work to be threaded. The other of the two parts is firmly but removably secured to the first in association with the mechanism of a die head for radial adjustment to obtain various diameters of threads, and for engaging and disengaging the thread cutting elements and the work.

As previously stated the present invention is an improvement over a die head corresponding to that of my Patent No. 2,291,919 employing chaser, chaser clamp and cooperating portions corresponding to my Patent No. 2,239,735 with the chaser carrying mechanism modified to improve the construction of the same and reduce the cost of the parts necessary for threading operations as well as the cost of such threading operations.

Further objects and advantages of my invention will be apparent from the following specification taken in conjunction with the accompanying drawings, wherein:

Fig. 1 is an end elevation of a die head showing one chaser holder and slide assembly in accordance with the present invention, an additional chaser holder slide mounted in one of the slide-ways of the chaser holder, with two slides and three holders omitted for purposes of illustration.

Fig. 3 is a sectional view along line 3—3 of Fig. 1, and

Figure 4:
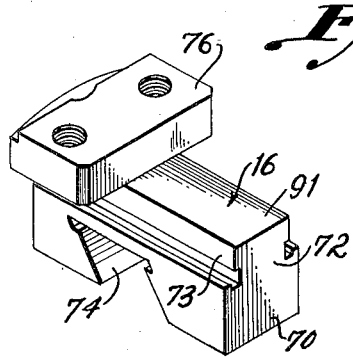

Fig. 4, an isometric view of the slide.

Figure 2:
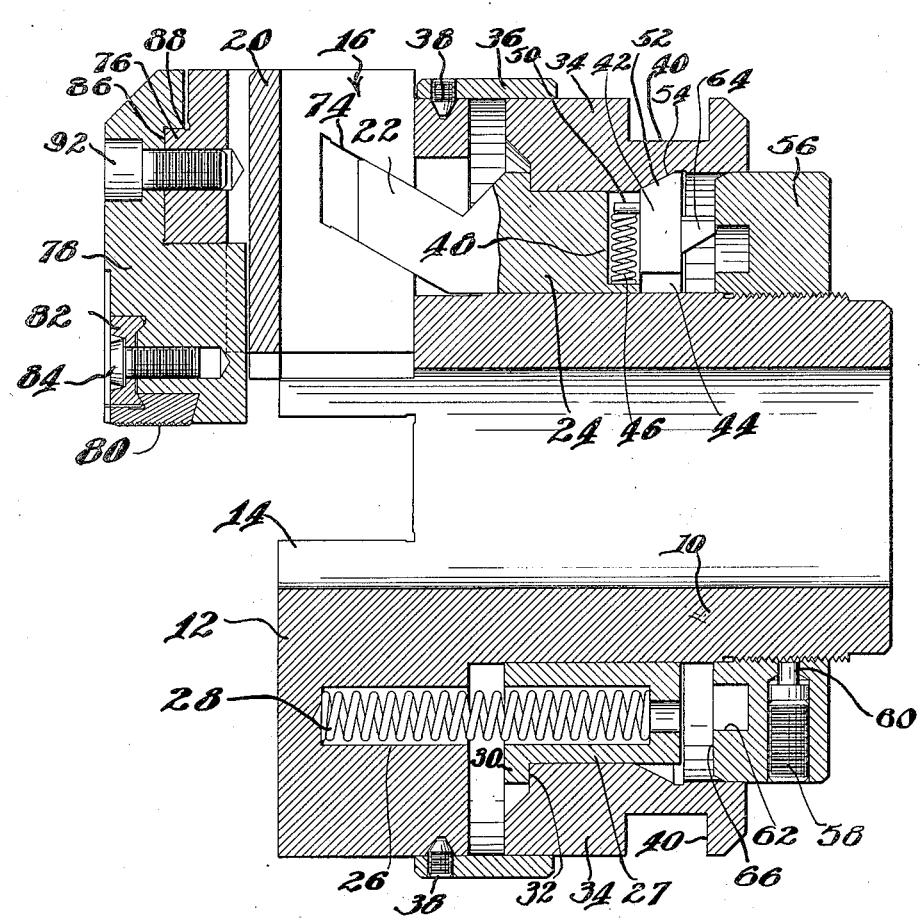
Fig. 2 is a longitudinal section on the line 2—2 of Fig. 1.

As shown in the drawings and with particular reference to Fig. 2, the die head consists of a head body having a shank 10 and an enlarged projection 12 at one end for carrying the chaser holding mechanisms. The head body may be provided with the usual means (not shown) for mounting the die head on a threading machine.

In order to provide for opening and closing of the die head to cut threads of different diametric sizes, the enlarged forward end of the head body is provided with rectangular radially disposed slots or slideways 14 in which chaser holder slides generally indicated at 16 are radially reciprocable. While there are shown four slideways and slides, the number may be varied as desired.

The slides 16 are held in their slideways by means of screws 18 which secure plates 20 to the head body, the side edges of the securing plates extending over the slideways as best shown in Fig. 3. The slides 16 are radially movable by prongs 22 preferably rectangular in cross section and which extend divergingly outward from the axis of the die head the broad flat outer and inner surfaces of the prongs bearing or camming against corresponding surfaces in the slides so that axial movement of the prongs will produce a desired radial movement of the slides with a camming action. The prongs 22 are carried by a closing ring 24 and as shown are preferably integral therewith.

In order to maintain the die head in fully open position, when it is unlocked, the enlarged end of the head body and the closing ring 24 are respectively provided with registering bores or spring pockets 26 and 27 and in which compression springs 28 are seated. These compression springs tend to separate these members. The closing ring 24 is provided with an external flange or shoulder 30 for engagement by a shoulder 32 of an operating ring 34 mounted upon the closing ring and which operating ring in turn is mounted within a guard ring 36 secured to the die head by suitable fasteners such as screws 38. The guard ring excludes foreign matter from the interior of the die head so that the operation of the die head is not interrupted by the same.

Movement of the operating ring 34 may be accomplished by suitable means not shown such as for example a yoke with fingers engageable in a circumferential groove 40 in the operating ring. Thus movement of the operating ring 34 forwardly toward the projection of the head body will compress the springs 28, and due to the angularity of the prongs 22 relative to the chaser holder slides the slides will be closed.

The operating mechanism for the slides also includes latching means for retaining the dies in closed position. This means includes latch members 42 mounted within radial ways 44 in the rear face of the closing ring 24. Latch members 42 are urged outwardly in the ways 44 by latch springs 46 mounted within bores or receiving apertures 48 adjacent the ways 44. The springs 46 engage flattened spring projections 50 carried by the latch members 42 and extending into the spring recesses 48 as shown in Fig. 2. The outer end of each of the latch members 42 is provided with a beveled surface 52 for engaging when the die head is closed a cam surface 54 on the inner surface of the operating ring 34.

The latching mechanism also includes a combined locking and adjusting ring 56 adjustably mounted on the head body by means of cooperating screw threads. The locking ring 56 is secured in adjusted position by means of a locking screw 58 and a soft locking plug 60, the screw 58 serving to press the soft locking plug into intimate engagement with the threads of the head body. On its forward face the ring 56 is provided with a circumferential groove 62 rectangular in cross section. This groove is adapted to receive latch retainers 64 when the operating ring is in its rearmost position and the die head is open. However, when the die head is in closed position as shown in Fig. 2, the latch retainers 64 are in their radially outward position with their rear extremities resting against the forward surface of the ring 56.

In the operation of the latching means it will be seen that with the parts in the position of Fig. 2 and the die head closed, the normal thrust of the springs 28 is borne by the latch retainers 64 which deliver the thrust to the fixed locking ring 56 and the die head is thus retained closed. Upon rearward movement of the operating ring 34 its cam surface 54 will move the latch members 42 radially inward against the tension of the springs 46, whereupon the latch retainers 64 will move into register with the groove 62 and springs 28 will force the operating ring 34 rearwardly with a snap action to provide a powerful, quick opening thrust by the prongs 22 on the slides 16.

With the slides radially outward or the die head in open position the latches 42 are held retracted against the tension of the springs 46 by the latch retainers 64 being within the groove 62.

When the operating ring 34 is subsequently moved forwardly, it carries with it the closing ring 24 thereby compressing the springs 28, and it also carries with it the latches 42 thus withdrawing the latch retainers 64 from the circumferential groove 62 whereupon the springs 46 will automatically snap the latch members outwardly. Thus by release of the operating ring the thrust of the springs 28 will be borne by the engagement of the ends of the latch retainers 64 with the ring 56.

The slides 16 of the chaser carrying assembly to which this invention is particularly directed each comprises the slide body 70 substantially rectangular in cross-section having a top 72 which extends upwardly between the securing plates 20. The slide body 70 is provided with an angularly disposed prong receiving recess 74 which is inclined to conform with the angularity of the prong with respect to the axis of the die body and thereby reciprocal motion of the prong will impart radial movement to the slide by virtue of the camming action therebetween. It will be understood, of course, that a snug fit is maintained between the prong and its recess as well as between the slide and the slideways, and the slideways 14 and the securing plates 20. The top 72 of the slide is substantially rectangular in horizontal section having side faces 73 and an upper surface 91 while a shoulder 76 is formed on the outer face of the top 72 of the slide. It is important in the construction of the top 72 that accurate maintenance of the angularity between the surfaces be maintained and that the surfaces be smoothly finished to insure a secure fit between the slide and the chaser holder 78. The chaser holder may be of conventional design as to its means of securing the chaser, here being indicated by the numeral 80 and being secured by a securing plate 82 through the medium of screws 84. The under face of the holder 78 is recessed in exact conformity with the configuration of the shouldered portion 76 of the top 72 to closely fit side faces 73 and engage upper surface 91, the recess 86 having exactly the same radial dimensions as the chaser holder slide, although greater axial dimensions and being formed with a shoulder 88 conforming to the shoulder 76, and in construction of the holder as well as the top 72 it is required that the faces of the recess be maintained with accurate angularity, and it is preferable that the corners be formed with clearances 90 so that the holder may be snugly fitted upon the top 72 without danger of any play or movement therebetween. Securing screws 92 are provided for securing the holder upon the slide.

It will be seen that by the construction here set forth the tool holder is firmly and securely carried by the slide. The front face of the top 72, together with the shoulder 76, secures the holder against any play in a radial direction while side walls of the holder snugly engage the side walls of the top 72 to prevent any transverse movement. By this construction it will be seen that since the top 72 and holder move together without any relative motion therebetween, there will be no wear or distortion of the surfaces between the holder and the top 72, the oppositely related walls of the top 72 insuring against any such movement and the wear resulting from the openings and closings of the guide and such vibration and strain as may be imparted thereto in the cutting operation is taken between the prong 22 and the side recess 74. Thus it will be seen that the holders may be interchangeable. The recess and the top 72, being free from wear or distortion, will at all times insure the exact location of the holder with respect to the top 72, and when it is required to change the holder, it is necessary only to remove the screws 92 and lift off the holder, substituting therefor a new holder which will be retained by its engagement with the top 72 in exactly the same relationship as was the holder which was removed.

It will be seen therefore that the invention provides a simple and rugged cam relationship for actuating the slide and further provides a removable holder mounted on the slide and secured against any possible relative movement with respect thereto and secured against any possibility of wear and deterioration between the contacting surfaces of the holder and the slide. And thus sets of holders may be provided having standard recesses, each conforming exactly to the configuration of the slide top 72. The sets are interchangeable without requiring the removal of the entire die head and without encountering deviations from the location of one set of holders with respect to the location of another set of holders.

As hereinbefore pointed out, it is understood that the actuating and latching mechanism herein set forth is merely by way of example and the invention is not limited to the specific structure here set forth by way of example. It may also be pointed out that the present invention is not limited to the exact configuration of the top 72 of the slide since various other configurations may be provided with which the recesses of the holders will conform in order to provide a tight non-wearing relationship.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. In a threading die head having a body, a front projection on said body provided with openings, a closing ring slidably mounted on said body, said closing ring having forwardly extending prongs constructed to extend into the openings in said front projection, the rear of said closing ring being fitted with radially movable latches, an adjusting ring threadedly mounted on said body, said adjusting ring having a circumferential groove of rectangular cross-section on one of its faces to receive said latches, an operating ring mounted on said closing and adjusting rings, said operating ring having rotary and axial movement on said closing and adjusting rings, a guard ring mounted on said projection of said body, said guard ring extending rearwardly over and around said operating ring for closing the interior of said head against foreign matter; the projection on the front of said body member having openings to receive chaser holder slides carrying chaser holders, said chaser holders and slides being cross keyed together and held together by threaded fasteners, and slide securing plates carried by said head for securing said slides to said head.

2. A chaser holder and slide assembly comprising a slide member having a base surface and parallel side surfaces for sliding upon coacting surfaces of a die head member, said slide member having a transverse slot, said slot opening upon said side and base surfaces and inclined outwardly from said base surface, the parallel inclined surfaces thus formed being adapted to act as camming surfaces for the radial movement of said chaser assembly when engaged by an axially movable die head member; a chaser holding member removably secured to said slide member, a chaser and chaser clamp mounted on said chaser holding member; said slide member and said chaser holding member having opposed coacting seating surfaces arranged for firmly uniting the same in a manner to prevent relative movement in any direction between said slide member and said chaser holding member.

3. In a chaser holder and slide assembly, the combination set forth in claim 2, wherein said chaser and clamp have mutually engaging clamping surfaces with interfitting projections.

4. In a die head having a head body with radially directed slideways in one end surface thereof, a chaser holder and slide assembly comprising a slide member, a chaser carrying member, a chaser and a chaser clamp, said slide member having a base portion with an inclined transverse opening of rectangular cross section extending upwardly thereinto and having a portion of reduced width upwardly adjacent said base portion, plates secured to said head body and extending into said slideways to engage the top surface of said base portion on each side of said portion of reduced width, whereby said slide is restrained from axial movement relatively to said head body, the base of said chaser carrying member being provided with a recess to receive said portion of reduced width whereby relative lateral movement between said slide member and said chaser carrying member is prevented, an upward extension on said slide member, said extension engaging surfaces on said chaser carrying member in substantially perpendicular relationship to said recess, said chaser carrying member being secured against axial movement relatively to said slide by screw means and having two parallel seating surfaces, one of said seating surfaces being engaged by said upward extension and the second of said seating surfaces being engaged by said portion of reduced width.

5. In a die head having a head body with radially disposed slideways in one end surface thereof, a chaser holder and slide assembly comprising a slide member, a chaser carrying member, a chaser and a chaser clamp, said slide member having a base with a portion of reduced width extending upwardly therefrom, means on said head for slidably retaining said slide in said slideways, a recess in said chaser carrying member for receiving said portion of reduced width whereby relative lateral movement between said slide member and said chaser carrying member is prevented, an upward extension on said slide member having engaging surfaces, and surfaces on said chaser carrying member for engaging said surfaces on said slide member in substantially perpendicular relationship to said recess, said chaser carrying member being secured against movement away from said slide member by screw means and relative movement of said chaser carrying member and said slide member in all other directions being prevented by the engagement of the portion of reduced width with said recess and by the engagement of said upward extension with the surfaces on said chaser carrying member.

6. A chaser holder and slide assembly comprising a slide member, a chaser carrying member, a chaser and a chaser clamp, said slide member having a base with a portion of reduced width extending upwardly therefrom, a recess in said chaser carrying member for receiving said portion of reduced width whereby relative lateral movement between said slide member and said chaser carrying member is prevented, an upward extension on said slide member having engaging surfaces, and surfaces on said chaser carrying member for engaging said surfaces on said slide member in substantially perpendicular relationship to said recess, said chaser carrying member being secured against movement away from said slide member by screw means and relative movement of said chaser carrying member and said slide member in all other directions being prevented by the engagement of the portion of reduced width with said recess and by the engagement of said upward extension with the surfaces on said chaser carrying member.

CHARLES A. REIMSCHISSEL.

REFERENCES CITED

The following references are of record in the file of this patent:

UNITED STATES PATENTS

| Number | Name | Date |
|---|---|---|
| 1,018,393 | Landis | Feb. 10, 1912 |
| 1,080,565 | Koontz | Dec. 9, 1913 |
| 1,510,962 | Russell | Oct. 7, 1924 |
| 1,867,191 | Strickland | July 12, 1932 |
| 1,952,205 | Hogg | Mar. 27, 1934 |
| 1,953,529 | Bysshe et al. | Apr. 3, 1934 |
| 2,054,028 | Benninghof | Sept. 8, 1936 |
| 2,082,757 | Reimschissel | June 1, 1937 |
| 2,108,149 | Strickland | Feb. 15, 1938 |
| 2,239,735 | Reimschissel | Apr. 29, 1941 |
| 2,291,919 | Reimschissel | Aug. 4, 1942 |
| 2,291,920 | Reimschissel | Aug. 4, 1942 |
| 2,333,163 | Finn | Nov. 2, 1943 |